(12) United States Patent
Shao-Horn et al.

(10) Patent No.: US 12,320,021 B2
(45) Date of Patent: Jun. 3, 2025

(54) METAL-HYDROXIDE-ORGANIC FRAMEWORKS AS HIGHLY TUNABLE ELECTROCATALYSTS

(71) Applicant: MASSACHUSETTS INSTITUTE OF TECHNOLOGY, Cambridge, MA (US)

(72) Inventors: Yang Shao-Horn, Newton, MA (US); Yuriy Roman, Cambridge, MA (US); Shuai Yuan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/835,149

(22) Filed: Mar. 30, 2020

(65) Prior Publication Data

US 2020/0308721 A1    Oct. 1, 2020

Related U.S. Application Data

(60) Provisional application No. 62/827,150, filed on Mar. 31, 2019.

(51) Int. Cl.

| | |
|---|---|
| *C25B 11/095* | (2021.01) |
| *C01G 3/02* | (2006.01) |
| *C01G 9/02* | (2006.01) |
| *C01G 45/02* | (2006.01) |
| *C01G 49/00* | (2006.01) |
| *C01G 51/04* | (2006.01) |
| *C01G 53/00* | (2006.01) |
| *C01G 53/04* | (2006.01) |
| *C07F 15/04* | (2006.01) |
| *C25B 1/02* | (2006.01) |

(52) U.S. Cl.
CPC ............ *C25B 11/095* (2021.01); *C01G 3/02* (2013.01); *C01G 9/02* (2013.01); *C01G 45/02* (2013.01); *C01G 49/0018* (2013.01); *C01G 51/04* (2013.01); *C01G 53/00* (2013.01); *C01G 53/04* (2013.01); *C07F 15/045* (2013.01); *C25B 1/02* (2013.01); *C01B 2203/1058* (2013.01); *C01B 2203/1076* (2013.01)

(58) Field of Classification Search
None
See application file for complete search history.

(56) References Cited

U.S. PATENT DOCUMENTS

2018/0226684 A1* 8/2018 Lu .................. H01M 10/052

FOREIGN PATENT DOCUMENTS

WO    WO-2020/205797 A1    10/2020

OTHER PUBLICATIONS

Ibarra et al. (Chem. Eur. J., 16, 13671-13679 (Year: 2010).*
Han et al. Polyhedron, 55, 2013, 249-258 (Year: 2013).*
International Search Report and Written Opinion for PCT/US2020/025830 mailed Jul. 24, 2020.
Yuxia Xu et al: "Ultrathin two-dimensional cobalt-organic framework 1nano sheets for high-performance electrocatalytic oxygen evolution", Journal of Materials Chemistry A, vol. 6, No. 44, Jun. 13, 2018 (Jun. 13, 2018), pp. 22070-22076, XP055713936.
Zhao-Feng Wu et al: "A series of Mg—Zn heterometallic coordination polymers: synthesis, characterization, and fluorescence sensing for Fe 3+ , CS 2 , and nitroaromatic compounds", Dalton Transactions, vol. 46, No. 37, Jan. 1, 2017 (Jan. 1, 2017), pp. 12597-12604, XP055714083.
Dongpeng Yan et al: "Regular assembly of 9-fluorenone-2,7-dicarboxylate within layered double hydroxide and its solid-state photoluminescence: a combined experiment and computational study", RSC Advances, vol. 3, No. 13, Jan. 1, 2013 (Jan. 1, 2013), p. 4303, XP055714094.
Daniel Micheroni et al: "Efficient Electrocatalytic Proton Reduction with Carbon Nanotube-Supported Metal-Organic Frameworks", Journal of the American Chemical Society, vol. 140, No. 46, Nov. 21, 2018 (Nov. 21, 2018), pp. 15591-15595, XP055714100.
Meiting Zhao et al: "Two-dimensional metal-organic framework nanosheets: synthesis and applications", Chemical Society Reviews, vol. 47, No. 16, Jan. 1, 2018 (Jan. 1, 2018), pp. 6267-6295, XP055714114.

* cited by examiner

*Primary Examiner* — Yun Qian
(74) *Attorney, Agent, or Firm* — Foley Hoag LLP; Dana M. Gordon; Alexander J. Chatterley

(57) ABSTRACT

Metal-hydroxide-organic framework compositions, methods of making metal-hydroxide-organic framework compositions and methods of using metal-hydroxide-organic framework compositions are described.

9 Claims, 21 Drawing Sheets

| Sample | Doping ratio (%) | pKa | Redox center (V) |
|---|---|---|---|
| Ni(OH)(L4) | 0 | 9.86 | 1.378 |
| Ga/Ni(OH)(L4) | 8.9 | 2.68 | 1.385 |
| Ti/Ni(OH)(L4) | 16.0 | 1.01 | 1.395 |
| Y/Ni(OH)(L4) | 24.8 | 7.70 | 1.391 |
| La/Ni(OH)(L4) | 17.9 | 9.06 | 1.404 |
| Ce/Ni(OH)(L4) | 15.6 | 5.50 | 1.449 |
| Al/Ni(OH)(L4) | 15.9 | 4.85 | 1.458 |
| Sc/Ni(OH)(L4) | 16.7 | 4.30 | 1.442 |
| Bi/Ni(OH)(L4) | 23.4 | 1.51 | 1.430 |

Summary of Pawley Refinement

| Parameter | $Ni_2(OH)_2(L1)$ |
|---|---|
| $R_{wp}$ | 9.97% |
| $R_p$ | 6.71% |
| Profile Function | Pseudo-Voigt |
| U | $1.17408 \pm 3.65092$ |
| V | $1.28638 \pm 0.45639$ |
| W | $-0.06765 \pm 0.02176$ |
| Space group | P-1 |
| $a$ (Å) | $10.68282 \pm 0.00353$ |
| $b$ (Å) | $6.14114 \pm 0.00273$ |
| $c$ (Å) | $3.53051 \pm 0.00402$ |
| $\alpha$ (°) | $100.85027 \pm 0.06782$ |
| $\beta$ (°) | $83.73871 \pm 0.10975$ |
| $\gamma$ (°) | $101.22783 \pm 0.06034$ |

FIG. 12

Summary of Pawley Refinement

| Parameter | $Ni_2(OH)_2(L2)$ |
|---|---|
| $R_{wp}$ | 8.12% |
| $R_p$ | 5.79% |
| Profile Function | Pseudo-Voigt |
| U | $1.17413 \pm 1.66028$ |
| V | $1.28638 \pm 0.46612$ |
| W | $-0.05743 \pm 0.01350$ |
| Space group | P-1 |
| $a$ (Å) | $12.43302 \pm 0.00287$ |
| $b$ (Å) | $6.50315 \pm 0.00242$ |
| $c$ (Å) | $3.96193 \pm 0.00301$ |
| $\alpha$ (°) | $103.68786 \pm 0.06066$ |
| $\beta$ (°) | $83.02174 \pm 0.05689$ |
| $\gamma$ (°) | $98.23297 \pm 0.04041$ |

FIG. 13

Summary of Pawley Refinement

| Parameter | $Ni_2(OH)_2(L3)$ |
|---|---|
| $R_{wp}$ | 9.36% |
| $R_p$ | 6.45% |
| Profile Function | Pseudo-Voigt |
| U | 1.17411 ± 5.33700 |
| V | 1.28649 ± 0.63993 |
| W | -0.03704 ± 0.02568 |
| Space group | P-1 |
| a (Å) | 15.33763 ± 0.00748 |
| b (Å) | 6.00959 ± 0.00337 |
| c (Å) | 3.76322 ± 0.00539 |
| α (°) | 89.99991 ± 9.55419 |
| β (°) | 90.00006 ± 7.59533 |
| γ (°) | 107.40038 ± 0.07326 |

FIG. 14

Summary of Pawley Refinement

| Parameter | $Ni_2(OH)_2(L4)$ |
|---|---|
| $R_{wp}$ | 7.43% |
| $R_p$ | 5.65% |
| Profile Function | Pseudo-Voigt |
| U | $1.79449 \pm 1.70094$ |
| V | $-0.09498 \pm 0.36007$ |
| W | $0.19799 \pm 0.01508$ |
| Space group | P-1 |
| a (Å) | $16.38013 \pm 0.00516$ |
| b (Å) | $6.42523 \pm 0.00756$ |
| c (Å) | $4.59045 \pm 0.00428$ |
| $\alpha$ (°) | $108.59759 \pm 0.11179$ |
| $\beta$ (°) | $89.92829 \pm 0.16536$ |
| $\gamma$ (°) | $91.66420 \pm 0.11920$ |

FIG. 15

METAL-HYDROXIDE-ORGANIC FRAMEWORKS AS HIGHLY TUNABLE ELECTROCATALYSTS

CLAIM OF PRIORITY

This application claims priority to U.S. Provisional Patent Application No. 62/827,150, filed Mar. 31, 2019, which is incorporated by reference in its entirety.

TECHNICAL FIELD

This invention relates to metal-hydroxide-organic framework compositions and methods of using the compositions.

BACKGROUND

Electrocatalysts can play a key role in clean energy conversion for a sustainable energy future. For example, many modern energy storage and conversion technologies, such as metal-air batteries and water electrolyzers, rely on oxygen evolution reaction (OER) promoted by noble-metal-catalysts. The large overpotentials and high cost for current OER catalysts decrease the energy conversion efficiency and hinder the practical application. Efforts have been made to design advanced electrocatalyst in homogenous and heterogenous systems. Both homogenous and heterogenous systems have their unique advantage and inherent limitations. Generally, homogeneous molecular catalysts have well-defined and highly tunable active sites, whereas the stability and recoverability from the reaction system seriously impedes their applications. In contrast, heterogeneous catalysts can be more stable and easily recyclable, but the structures of active centers are relatively difficult to control, hindering the rational design and mechanistic understanding of catalysts.

SUMMARY

In general, a catalytic system can be developed that combines the advantage of both homogenous and heterogenous ones, while reducing or avoiding their individual disadvantages.

In one aspect, a composition can include a plurality of a transition metal hydroxide component, and a plurality of a ligand component, the ligand component including at least two functional groups linearly arranged on a backbone, each functional group associated with one of the transition metal component, wherein the composition forms a layered structure.

In another aspect, a method for making a composition can include contacting plurality of a transition metal hydroxide component with a plurality of a ligand component, the ligand component including at least two functional groups linearly arranged on a backbone, each functional group associated with one of the transition metal component, wherein the composition forms a layered structure.

In another aspect, a method of electrocatalyzing a reaction can include electrolyzing a substrate with a composition described herein.

In certain circumstances, the backbones of the plurality of the ligand components can π-stack with adjacent backbones.

In certain circumstances, the functional group can be a carboxylate.

In certain circumstances, the backbone can be aromatic

In certain circumstances, the plurality of the ligand components can include linear dicarboxylate aromatic compounds.

In certain circumstances, the transition metal hydroxide can include a hydroxide of $Mn^{2+}$, $Fe^{2+}$, $Co^{2+}$, $Ni^{2+}$, $Cu^{2+}$ or $Zn^{2+}$.

In certain circumstances, the transition metal hydroxide can be doped with a metal ion. For example, the doped metal ion can include gallium, titanium, zinc, zirconium, lanthanum, cerium, aluminum, copper, or iron ions.

In certain circumstances, the composition can include carbon.

In certain circumstances, the backbone can be an aryl or heteroaryl.

In certain circumstances, the composition can have a formula $M_2(OH)_2(L)$, wherein M is $Mn^{2+}$, $Fe^{2+}$, $Co^{2+}$, $Ni^{2+}$, $Cu^{2+}$ or $Zn^{2+}$ and L is a linear dicarboxylate-based linker, and doped compositions thereof.

Other aspects, embodiments, and features will be apparent from the following description, the drawings, and the claims.

A comparison of (panel b) PXRD patterns (panel c) TGA curves and (panel d) CV curves of 2D nanosheets exfoliated along different directions. Electrochemical test condition: 125 μg cm$^{-2}$ MOF, 0.2 cm$^2$ RDE, 20 m V/S, 1600 rpm, $O_2$ saturated 0.1 M KOH.

Figure 9:
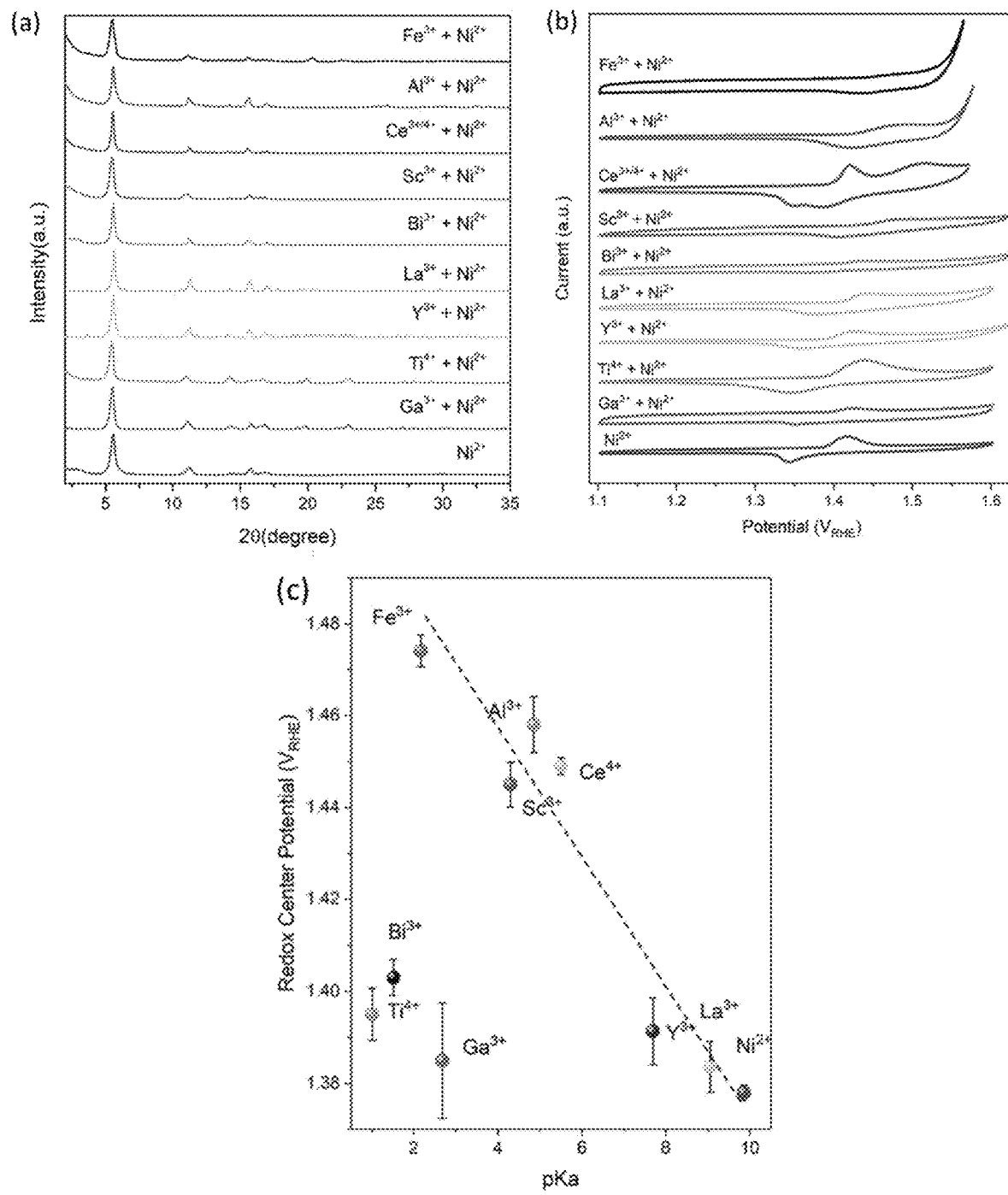
Figure 9:
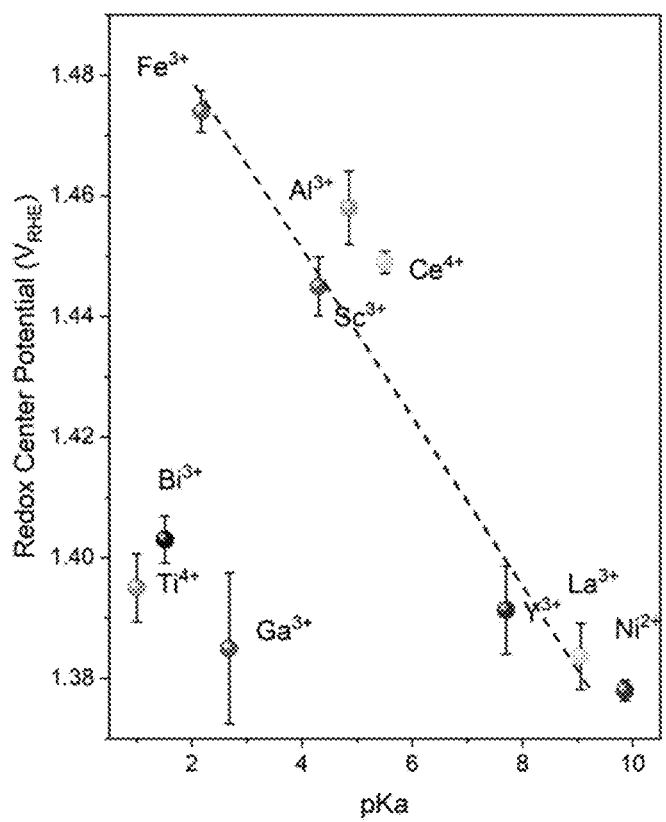

FIG. 9 shows (panel a) PXRD and (panel b) CV of $Ni_2(OH)_2(L4)$ doped with different metals. Panel c shows correlation between redox center potential and pKa of doping metals.

Figure 10:
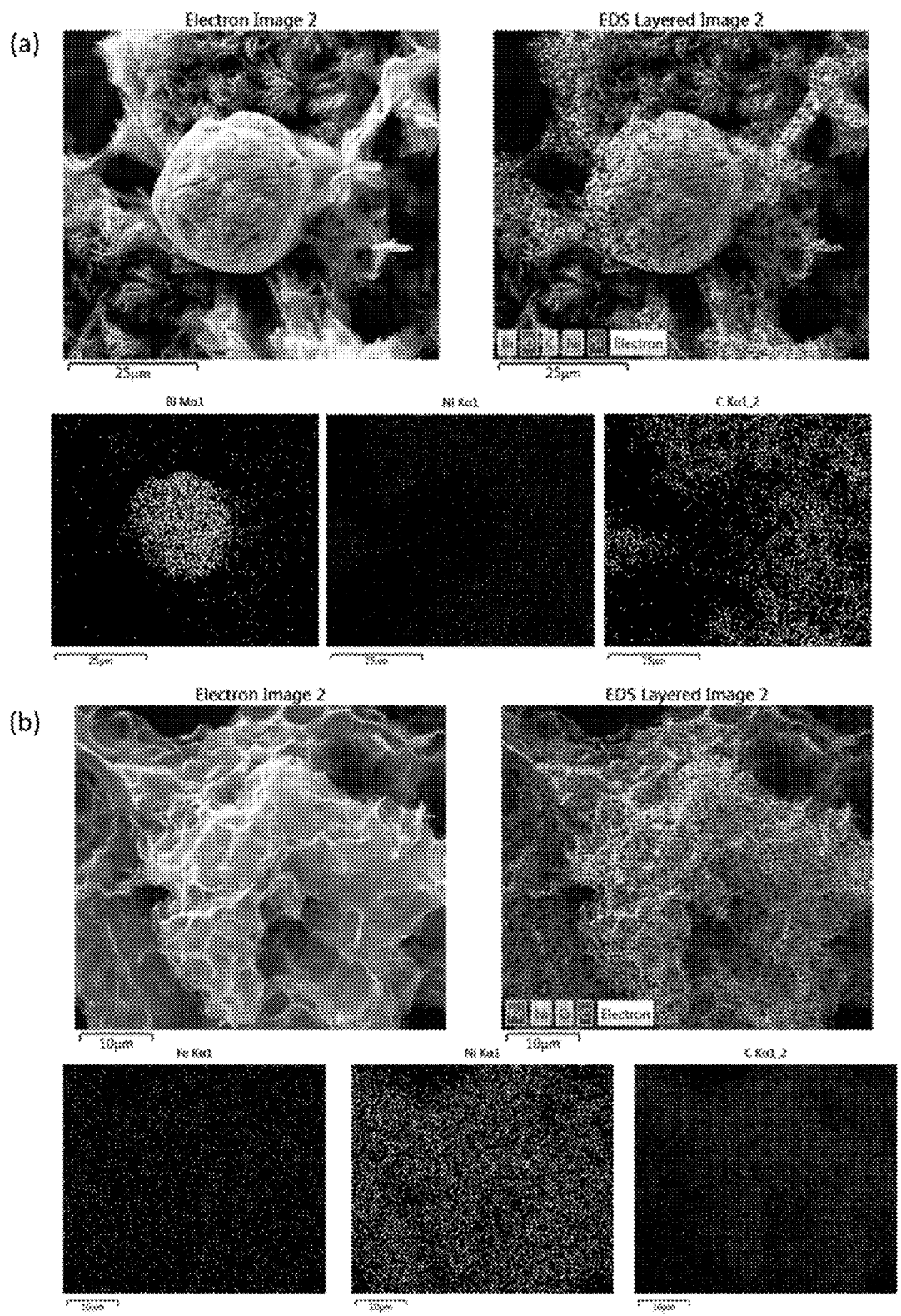

FIG. 10 shows elemental mapping of $Bi/Ni_2(OH)_2(L4)$ and $Fe/Ni_2(OH)_2(L4)$ by SEM/EDX.

Figure 11:
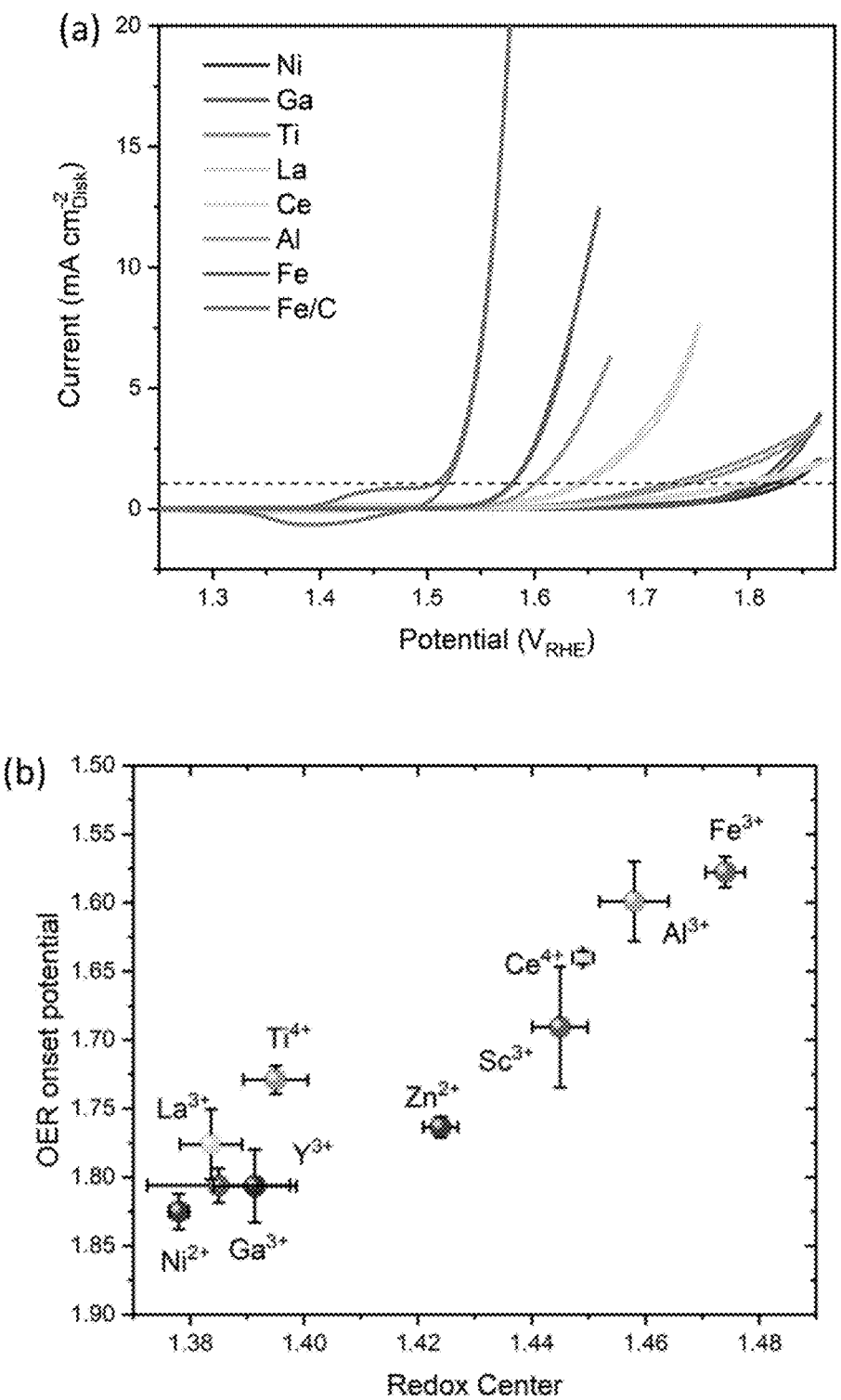

FIG. 11 shows (a) CV of $Ni_2(OH)_2(L4)$ doped with different metals. (b) Correlation between OER onset (1 mA cm$^{-2}$) potential and pKa of doping metals.

Figure 2:
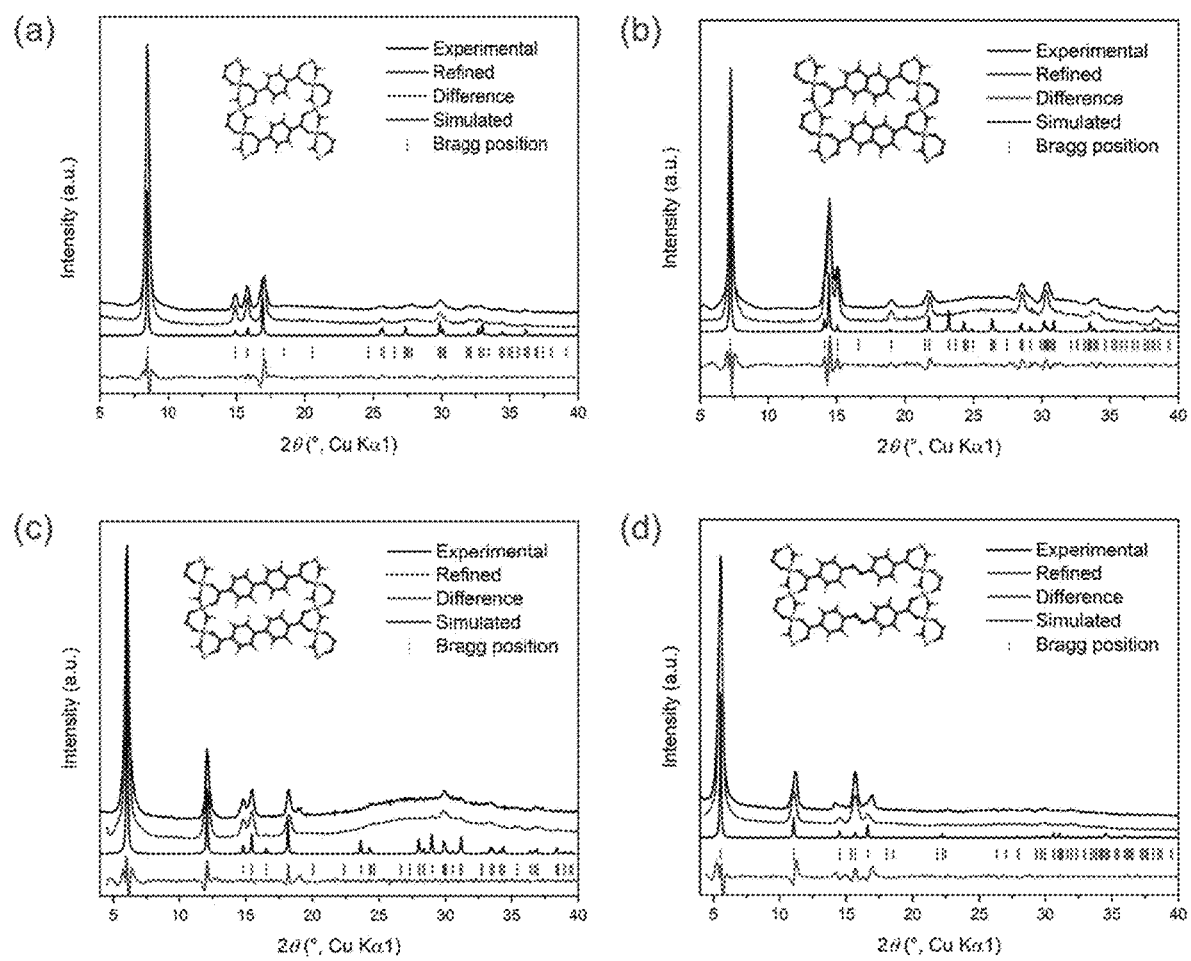
FIG. 2 shows Pawley refinement against PXRD of (panel a) Ni(OH)(L1), (panel b) Ni(OH)(L2), (panel c) Ni(OH)(L3), and (panel d) Ni(OH)(L4). Data are shown in FIGS. 12-16, respectively.

FIGS. 12-15 show summaries of the Pawley refinements of FIG. 2.

Figure 16:
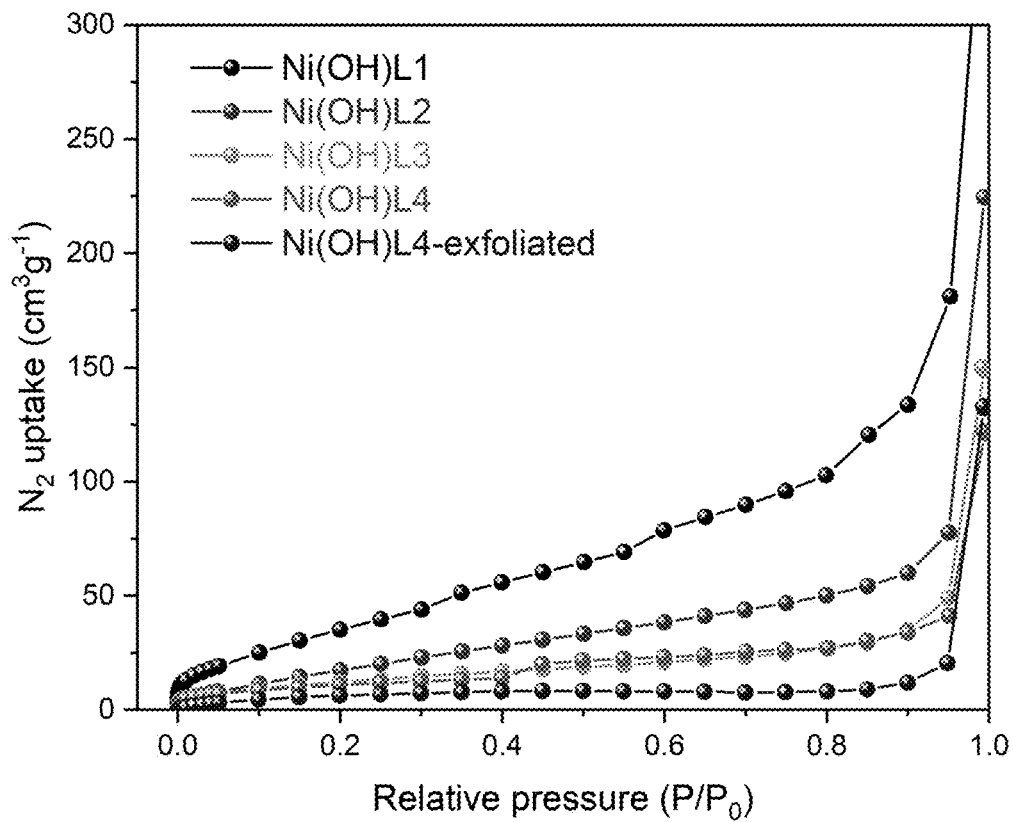

FIG. 16 shows $N_2$ adsorption measurements and BET surface area measurements.

Figure 17:
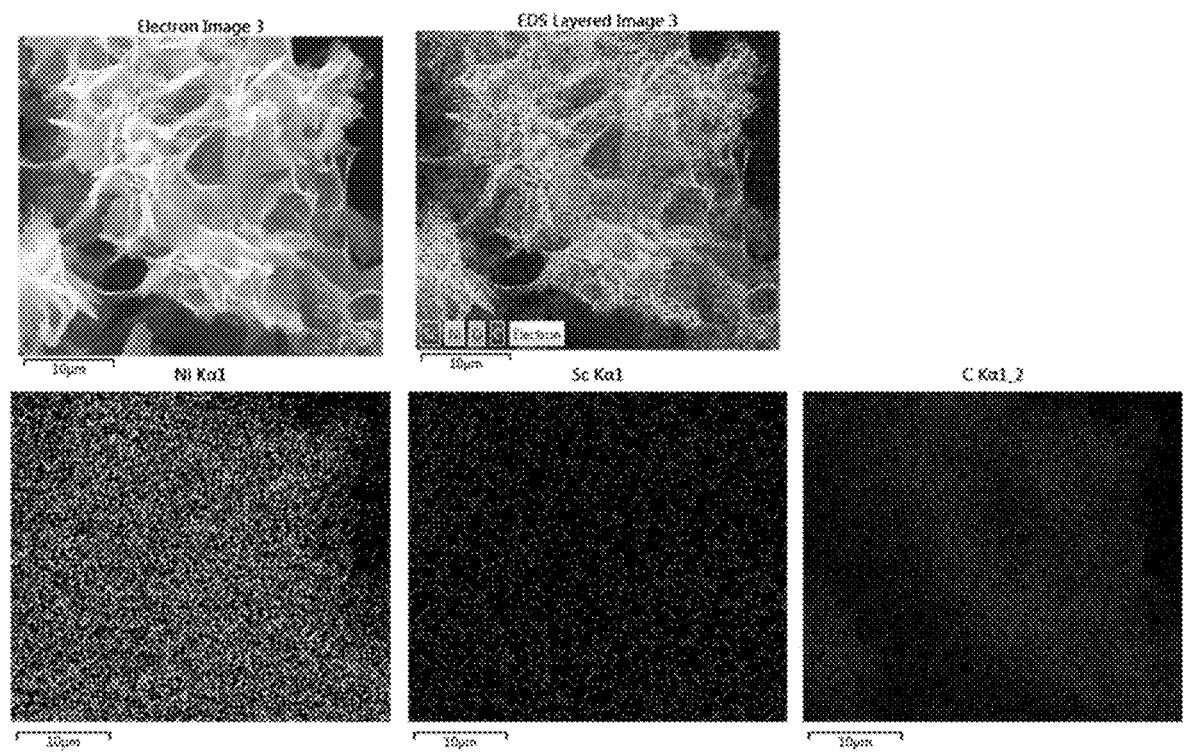

FIG. 17 shows elemental mapping of a $Sc/Ni_2(OH)_2(L4)$ composition.

Figure 18:
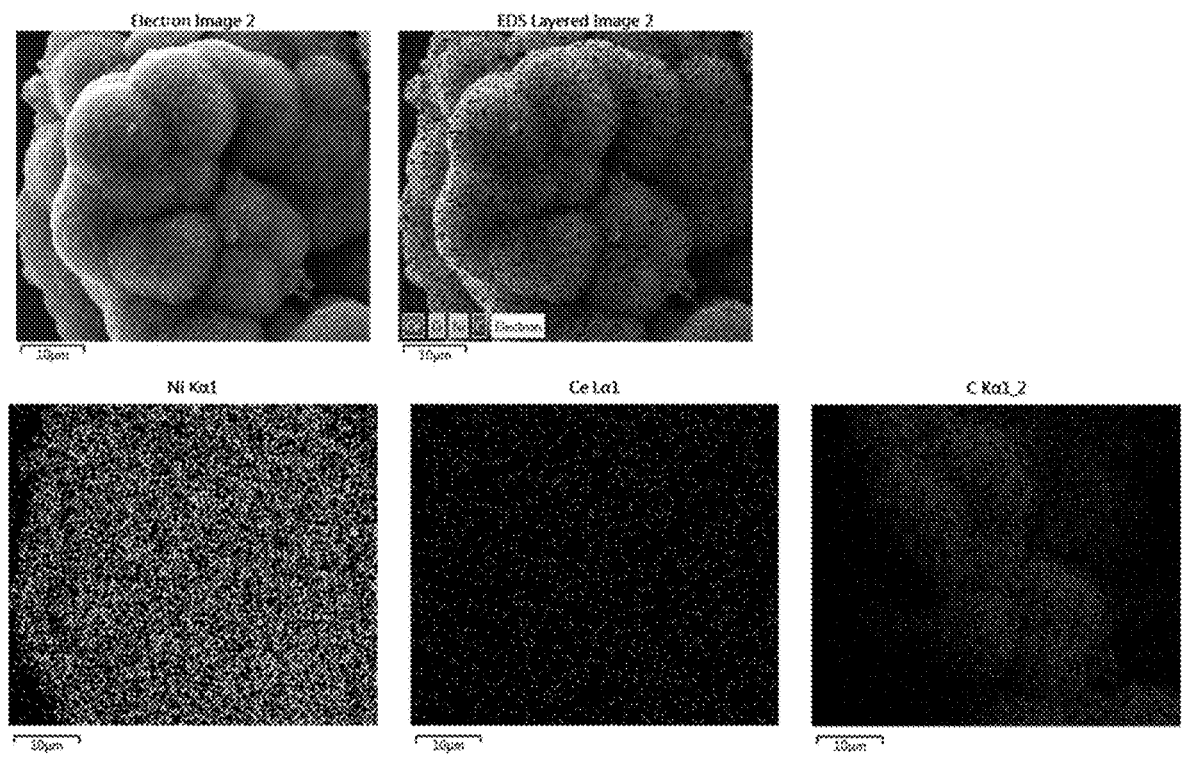

FIG. 18 shows elemental mapping of a $Ce/Ni_2(OH)_2(L4)$ composition.

Figure 19:
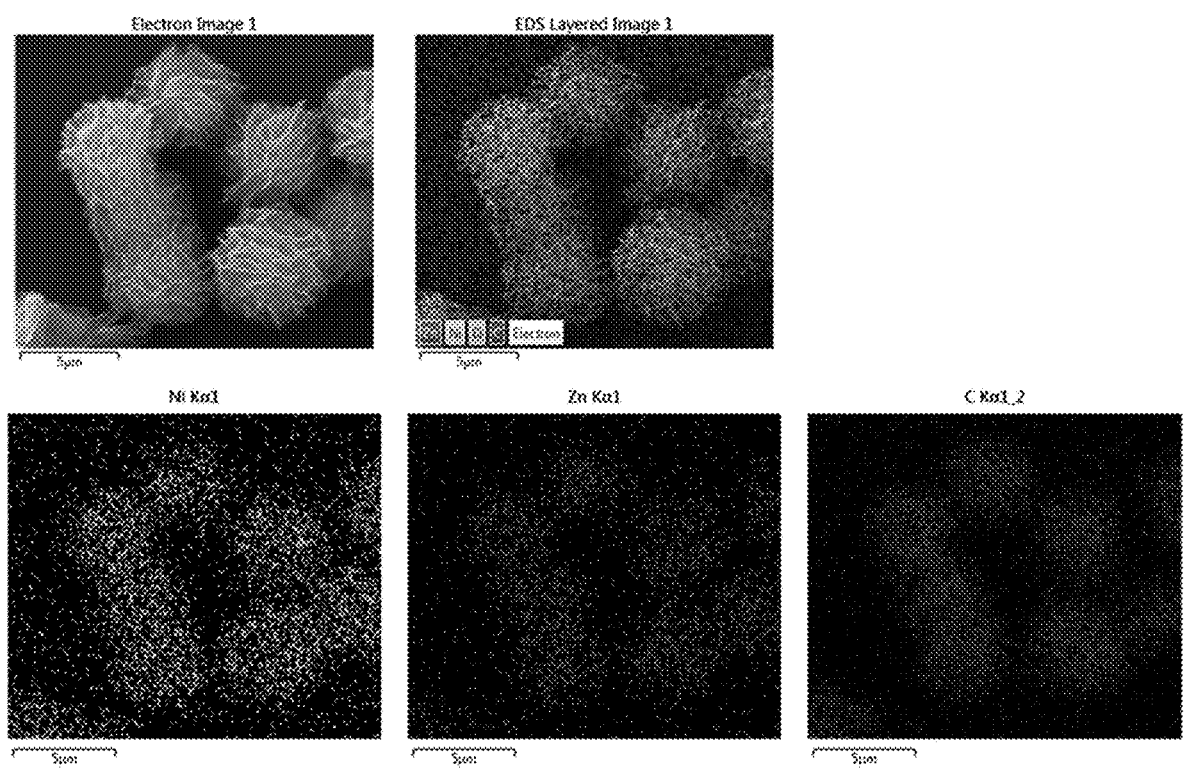

FIG. 19 shows elemental mapping of a $Zn/Ni_2(OH)_2(L4)$ composition.

Figure 20:
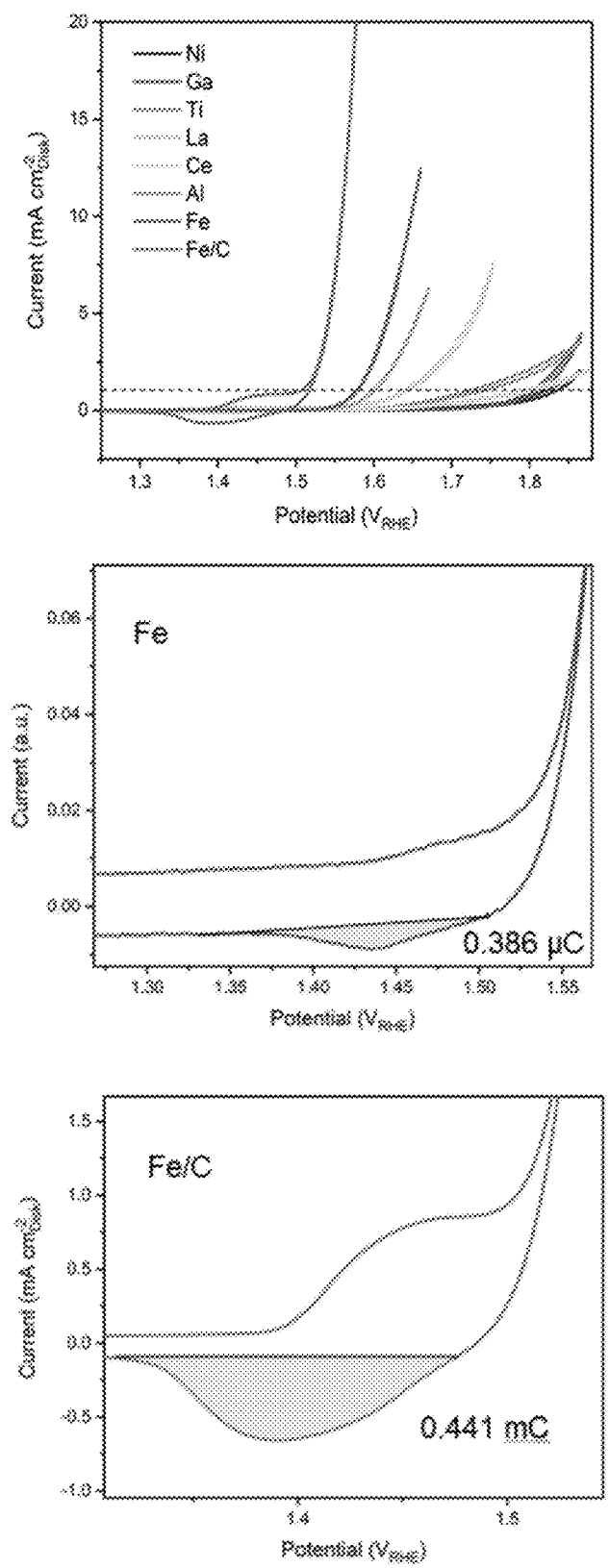

FIG. 20 shows the effect of carbon on characteristics of the composition.

DETAILED DESCRIPTION

In general, the materials and methods described herein relate to a tunable platform to modify the stability, morphology and electronic structure of materials to create compositions with unique structures and properties. In particular, a new class of inorganic-organic hybrid materials, namely metal-hydroxide-organic frameworks (MHOFs) has been synthesized. The compositions can combine the advantages of heterogenous metal-oxide and homogenous molecular catalysts. In addition, by controlling π-π stacking of organic species in MHOFs, the chemical stability of this material can be enhanced compared to traditional metal-organic frameworks. In addition, the MHOF compositions can be extended to electrocatalysis. The MHOFs can form 2D nanosheets, therefore exposing the edge metal sites as electrocatalytic active sites. This structure can be highly desired in electrocatalysts, but extremely difficult to realize in traditional metal (hydr)oxide materials. Another advantage of the electronic structure of MHOFs is that the compositions can be fine-tuned by metal doping, allowing the rational optimization of electrocatalytic activities. As demonstrated below, the oxygen evolution activity can be dramatically enhanced by doping MHOFs with acidic metal cations.

Metal-organic frameworks (MOFs) or MOFs are crystalline porous solids constructed by self-assembly of metal cations (or metal clusters) and organic ligands. As a class of inorganic-organic hybrid materials, MOFs thrive on their high tunability. Analogous to molecular catalysts, the structure and composition of MOFs can be precisely designed by judicious selection of metals and ligands. The well-defined structure of MOFs facilities the understanding of active site structures and reaction mechanisms. The ability to design solid catalyst at atomic precision within MOF platforms brings new opportunity to the development of advanced electrocatalyst that combines the advantage of both homogenous and heterogenous systems. However, current MOF electrocatalysts still suffer from poor chemical stability and limited conductivity, which renders the catalytic active site of MOFs inaccessible. Furthermore, the capability of MOFs to fine tune the electronic structures was not fully exerted in the catalysts design. Herein, a new class MOFs is introduced, namely metal-hydroxide-organic frameworks (MHOFs), as a highly tunable platform to optimize the chemical stability, surface structures and electronic structures of active sites.

Figure 1:
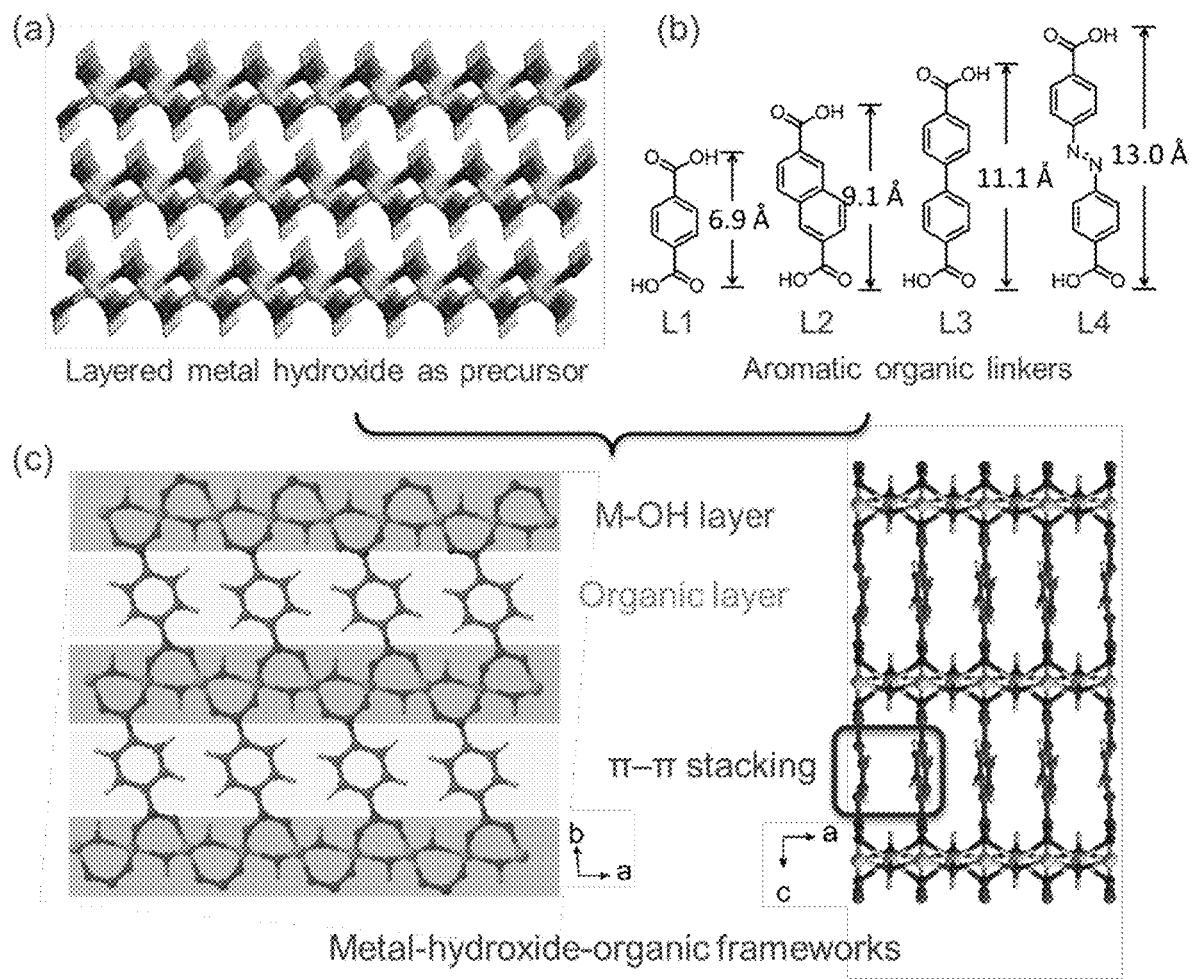
FIG. 1 shows a design of ultra-stable MOFs with (panel a) layered metal hydroxide as metal nodes and (panel b) aromatic organic molecules as linkers. Panel C shows structural representation of MOFs composed of metal-oxide layers and organic linker layers with π-π stacking between linkers.

The design of MHOFs can be based on the structures of layered metal hydroxides (FIG. 1, panel a). It is known that intercalation of layered hydroxides can occur by partially replacing the bridging OH$^-$ or anions between the layer. However, the intercalated moieties are usually terminal ligands or flexible organic linkers, which are susceptible towards water or base, because the attached terminal ligands can be easily replaced by OH$^-$. The material stability can be dramatically enhanced if π-π stacking were formed between intercalated linkers. As expected, by connecting the metal hydroxide layers through aromatic organic linkers that form strong π-π interaction, a series of stable MHOFs were obtained.

Crystalline powders of metal-hydroxide-organic frameworks were obtained by the reaction between metal hydroxide nanosheets and aromatic organic linkers. Different metals (including $Mn^{2+}$, $Fe^{2+}$, $Co^{2+}$, $Ni^{2+}$, $Cu^{2+}$ or $Zn^{2+}$) and ligands (L1-L4, FIG. 1, panel b) were adopted to form isostructural MOF series. They are formulated as $M_2(OH)_2(L)$ (M=$Mn^{2+}$, $Fe^{2+}$, $Co^{2+}$, $Ni^{2+}$, $Cu^{2+}$ or $Zn^{2+}$; L=linear dicarboxylate-based linkers; note that the combination of any aforementioned metals and ligands can form MHOFs). Taking $Ni_2(OH)_2(L1)$ as an example, its structure can be described as an alternatively arranged Ni—OH layers and terephthalate ligands (FIG. 1, panel c). The distance between closely packed organic ligands was measured to be 3.46 Å, corresponding to the π-π stacking distance.

The structures of metal-hydroxide-organic frameworks were confirmed by Pawley refinement against PXRD patterns (FIG. 2). Data are shown in FIGS. 12-15. Surface area measurements can be found in FIG. 16. The first peak, corresponding to the layer distance, was shifted to low angle upon the elongation of organic linkers. Their refinement details and unit cell parameters are summarized in Table 1. The a-axis lengths gradually increase with elongated ligands, in line with the enlarged interlayer distance. On the other hand, the b-and c-cell parameters were not significantly changed, indicating the same M-OH layer structure within all the MHOFs.

TABLE 1

| Unit cell and refine parameters of metal-hydroxide-organic frameworks | | | | |
|---|---|---|---|---|
| Parameter | $Ni_2(OH)_2(L1)$ | $Ni_2(OH)_2(L2)$ | $Ni_2(OH)_2(L3)$ | $Ni_2(OH)_2(L4)$ |
| $R_{wp}$ | 9.97% | 8.12% | 9.36% | 7.43% |
| $R_p$ | 6.71% | 5.79% | 6.45% | 5.65% |
| Profile Function | Pseudo-Voigt | Pseudo-Voigt | Pseudo-Voigt | Pseudo-Voigt |

TABLE 1-continued

Unit cell and refine parameters of metal-hydroxide-organic frameworks

| Parameter | $Ni_2(OH)_2(L1)$ | $Ni_2(OH)_2(L2)$ | $Ni_2(OH)_2(L3)$ | $Ni_2(OH)_2(L4)$ |
|---|---|---|---|---|
| U | 1.17408 ± 3.65092 | 1.17413 ± 1.66028 | 1.17411 ± 5.33700 | 1.79449 ± 1.70094 |
| V | 1.28638 ± 0.45639 | 1.28638 ± 0.46612 | 1.28649 ± 0.63993 | −0.09498 ± 0.36007 |
| W | −0.06765 ± 0.02176 | −0.05743 ± 0.01350 | −0.03704 ± 0.02568 | 0.19799 ± 0.01508 |
| Space group | P-1 | P-1 | P-1 | P-1 |
| a (Å) | 10.68282 ± 0.00353 | 12.43302 ± 0.00287 | 15.33763 ± 0.00748 | 16.38013 ± 0.00516 |
| b (Å) | 6.14114 ± 0.00273 | 6.50315 ± 0.00242 | 6.00959 ± 0.00337 | 6.42523 ± 0.00756 |
| c (Å) | 3.53051 ± 0.00402 | 3.96193 ± 0.00301 | 3.76322 ± 0.00539 | 4.59045 ± 0.00428 |
| α (°) | 100.85027 ± 0.06782 | 103.68786 ± 0.06066 | 89.99991 ± 9.55419 | 108.59759 ± 0.11179 |
| β (°) | 83.73871 ± 0.10975 | 83.02174 ± 0.05689 | 90.00006 ± 7.59533 | 89.92829 ± 0.16536 |
| γ (°) | 101.22783 ± 0.06034 | 98.23297 ± 0.04041 | 107.40038 ± 0.07326 | 91.66420 ± 0.11920 |

The MHOFs are new class of hybrid materials composed of both inorganic and organic moieties. Compared with metal oxide and metal hydroxide, the organic components of metal-hydroxide-organic frameworks bring new opportunities to tune their physicochemical properties.

The MHOF can be a layered structure. The MHOF can include a plurality of metal-hydroxide layers, each metal-hydroxide layer being linked by a layer of divalent ligands to form a layer of ligands adjacent and between two metal-hydroxide layers.

The composition that forms the MHOF can have the formula $M_2(OH)_2(L)$, in which M is $Mn^{2+}$, $Fe^{2+}$, $Co^{2+}$, $Ni^{2+}$, $Cu^{2+}$ or $Zn^{2+}$ and L can be a divalent ligand. The divalent ligand can be a linear dicarboxylate-based linker. The linker can have a backbone. The backbone can be an aryl or heteroaryl group.

The term "aryl" refers to monocyclic, bicyclic or tricyclic aromatic hydrocarbon groups having from 6 to 14 carbon atoms in the ring portion. In one embodiment, the term aryl refers to monocyclic and bicyclic aromatic hydrocarbon groups having from 6 to 10 carbon atoms. Representative examples of aryl groups include phenyl, naphthyl, fluorenyl, and anthracenyl.

The term "aryl" also refers to a bicyclic or tricyclic group in which at least one ring is aromatic and is fused to one or two non-aromatic hydrocarbon ring(s). Nonlimiting examples include tetrahydronaphthalene, dihydronaphthalenyl and indanyl.

As used herein, the term "heteroaryl" refers to a 5-14 membered monocyclic-, bicyclic-, or tricyclic-ring system, having 1 to 10 heteroatoms independently selected from N, O or S, wherein N and S can be optionally oxidized to various oxidation states, and wherein at least one ring in the ring system is aromatic. In one embodiment, the heteroaryl is monocyclic and has 5 or 6 ring members. Examples of monocyclic heteroaryl groups include pyridyl, thienyl, furanyl, pyrrolyl, pyrazolyl, imidazoyl, oxazolyl, isoxazolyl, thiazolyl, isothiazolyl, triazolyl, oxadiazolyl, thiadiazolyl and tetrazolyl. In another embodiment, the heteroaryl is bicyclic and has from 8 to 10 ring members. Examples of bicyclic heteroaryl groups include indolyl, benzofuranyl, quinolyl, isoquinolyl indazolyl, indolinyl, isoindolyl, indolizinyl, benzamidazolyl, quinolinyl, 5,6,7,8-tetrahydroquinoline and 6,7-dihydro-5H-pyrrolo[3,2-d]pyrimidine.

The composition can be doped. The doped composition can include carbon, or a metal ion, such as, for example, gallium, titanium, zinc, zirconium, lanthanum, cerium, aluminum, copper, or iron ions.

The composition can be placed on an electrode for use in an electrocatalysis process.

1. Enhancing the Framework Stability by Extending π-Conjugation

Figure 3:
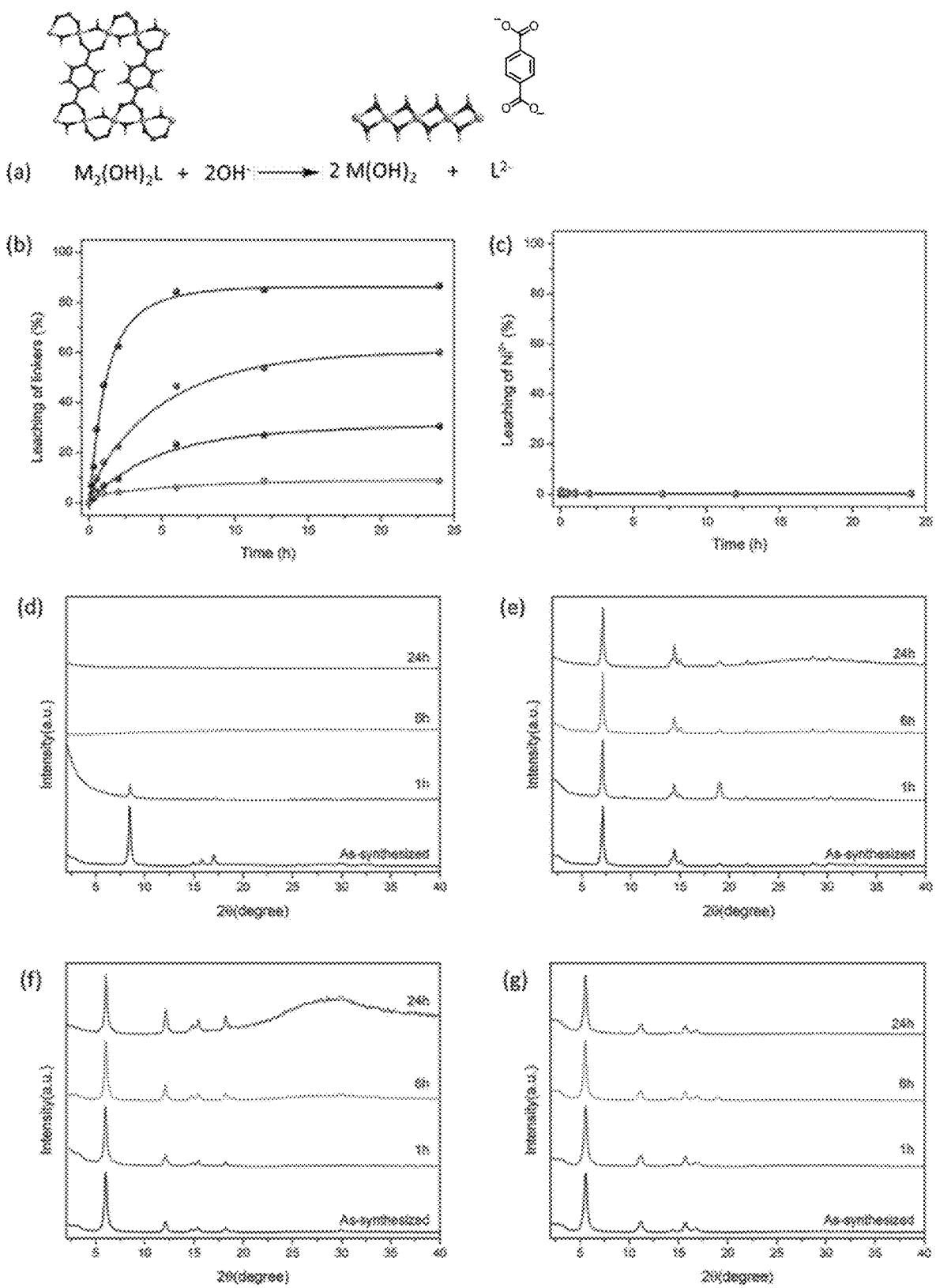
FIG. 3 shows stability test of MHOFs. Panel a shows proposed decomposition mechanism of HMOFs. Leaching ratios of ligands (panel b) and metal cations (panel c) monitored by UV-vis and ICP-OES. PXRD of (panel d) $Ni_2(OH)_2(L1)$, (panel e) $Ni_2(OH)_2(L2)$, (panel f) $Ni_2(OH)_2(L3)$, and (panel g) $Ni_2(OH)_2(L4)$ after stability test.

The electrochemical application of traditional MOFs is primary limited by their chemical stability. Electrocatalysis are usually carried out in strong acid or base, which is too harsh for most MOFs. For example, the decomposition reaction of MHOFs under basic conditions can be expressed as a replacement of organic linkers by OH⁻ to form metal hydroxides (FIG. 3, panel a). In chemistry, π-π stacking formed between aromatic rings can stabilize molecular aggregates from dissolution regardless of the pH environment. Therefore, the π-π stacking interactions between aromatic ligands in MHOFs can contribute to the framework stability.

The stability test of were conducted by immersing 100 mg of $Ni_2(OH)_2(L)$ (L=L1-L4) samples in 100 mL aqueous solution of 0.1 M KOH, a mimic of the solution used for electrochemical test. The supernatants were analyzed by UV-vis and ICP-OES to detect the leaching of organic linkers and metal cations respectively (FIG. 3, panels b and c). The remaining solids after stability test were examined by PXRD (FIG. 3, panels d-g). Leaching of organic linkers were detected in the supernatants by UV-vis, whereas no obvious metal leaching was observed. This is in line with the reaction mechanism that MHOFs decompose into non-soluble metal hydroxide while releasing the organic linkers. As expected, the size of π-conjugated systems have strong influence on the stability of MHOFs. $Ni_2(OH)_2(L1)$ shows the lowest chemical stability, which lose almost 50% of organic linkers in base after 1 h. PXRD of $Ni_2(OH)_2(L1)$ also indicate a significant loss of crystallinity during stability test. Indeed, the aromatic rings of terephthalate are still too small to form strong π-π interaction. Using elongated ligands with larger aromatic π-systems, the framework stability was dramatically enhanced.

Among all the metal-hydroxide-organic frameworks, Ni(OH)(L4) with the largest aromatic systems, exhibits the highest chemical stability, which can survive in 0.1 M KOH for 24 h.

Figure 4:
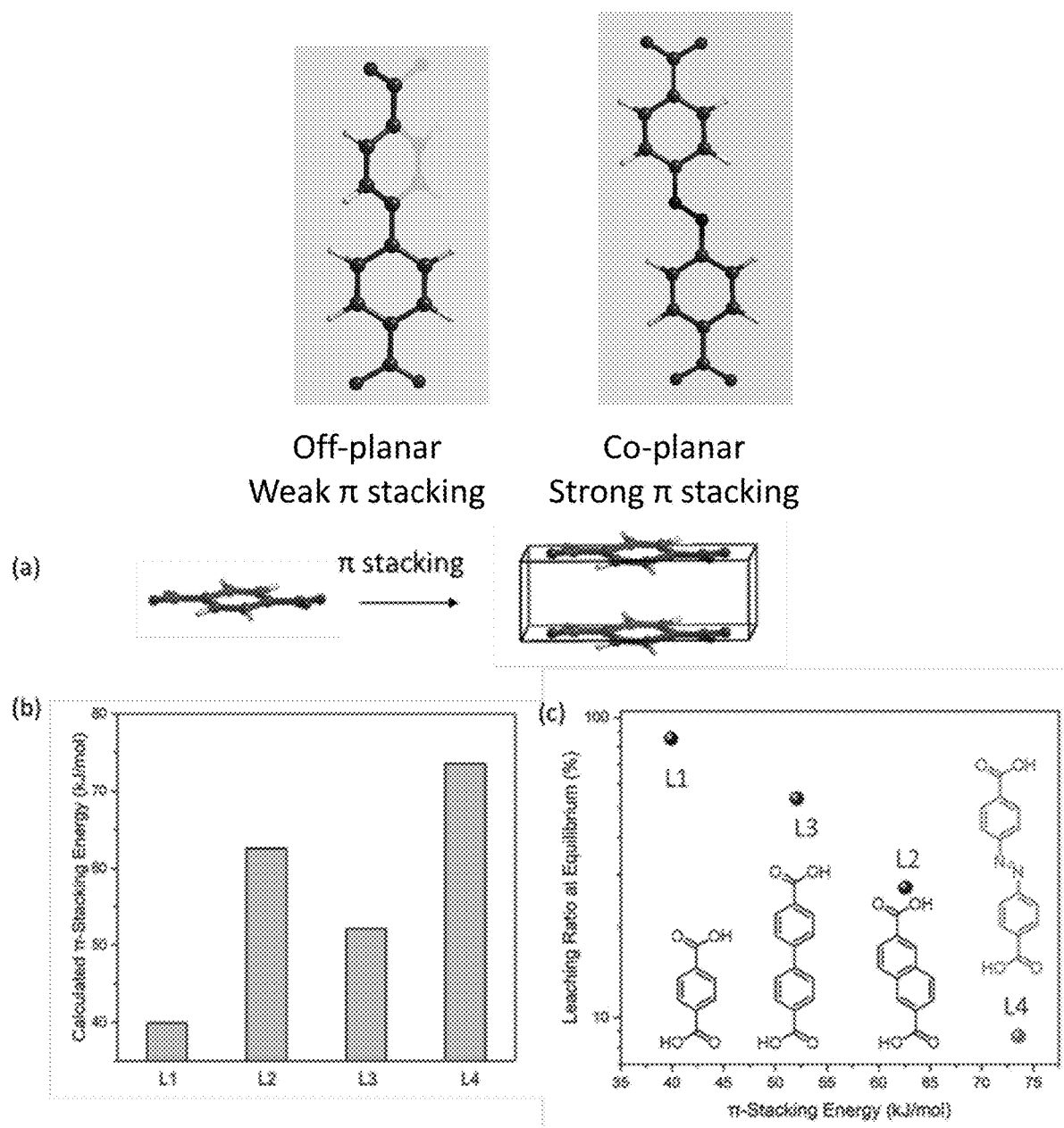
FIG. 4 shows a mechanistic understanding of stability trend by DFT calculations. Panel a shows a schematic representation of the π-stacking energy by comparing the energy of ligands in vacuum and in MOF lattice. Panel b shows a calculated π-stacking energy of different linkers. Panel c shows correlation between linker leaching ratio at equilibrium and π-stacking energy. DFT calculation details: Computations were performed with the DMol3 programs of Materials Studio 6.0.13 using Local Density Approximation (LDA)-PWC functional and DND 3.5 basis.

To rationalize the stability trend of MHOFs formed by different linkers, DFT calculations were adopted. The π-stacking energy were calculated by comparing the energy of ligands in vacuum and in MOF lattice (FIG. 4, panel a). DFT calculation indicates that the π-stacking energy is related to the size of linkers except for L3 (FIG. 4, panel b). In fact, the two phenyl rings of L3 tends to form an off planar conformation because of the steric hinderance between neighboring H atoms. This destabilizes the π-stacking and reduced the π-stacking energy. In contrast, other organic linkers all have a co-planar conformation with efficient π-stacking. The leaching ratio of linkers at equilibrium was plotted against the calculated π-stacking energy, showing a positive correlation (FIG. 4, panel c).

2. Controlling the Morphology: From 3D Bulk Materials to 2D Nanosheets

Figure 5:
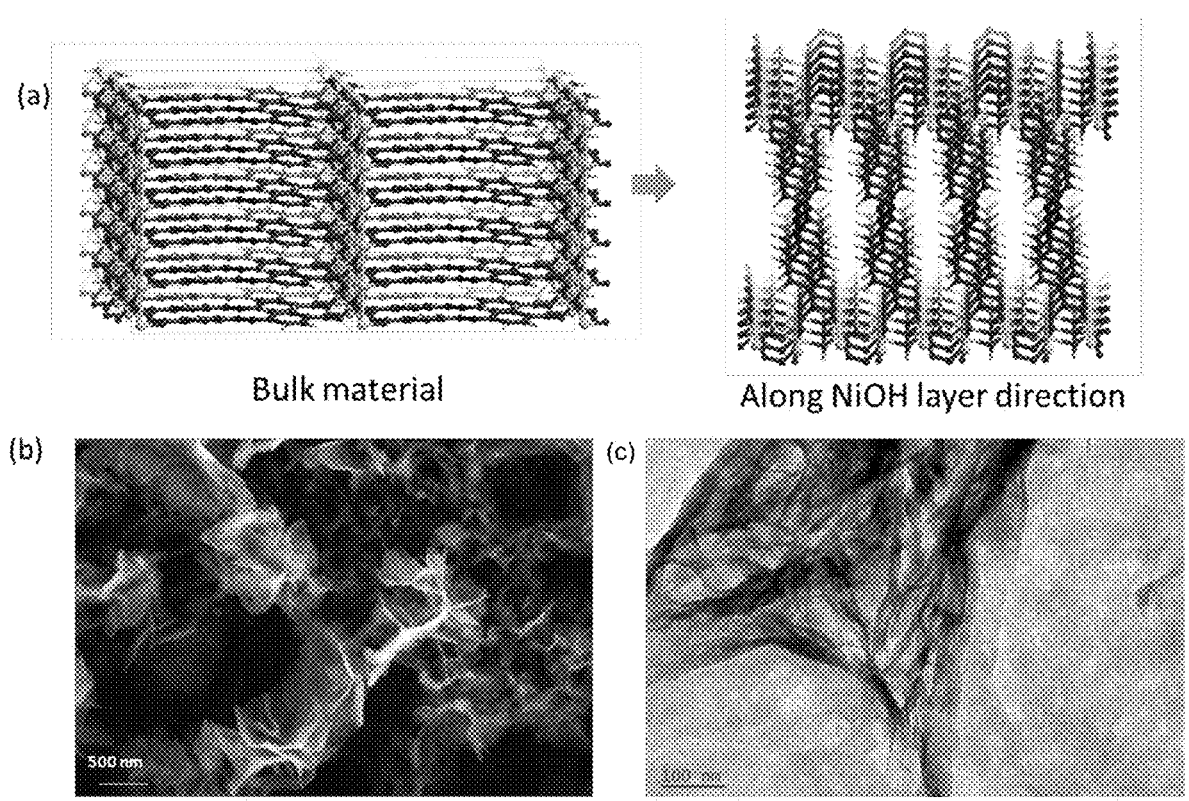
FIG. 5 shows (panel a) structural model, (panel b) SEM and (panel c) TEM images of 2D nanosheets exfoliated along NiOH layer direction of bulk $Ni_2(OH)_2(L4)$.
Figure 6:
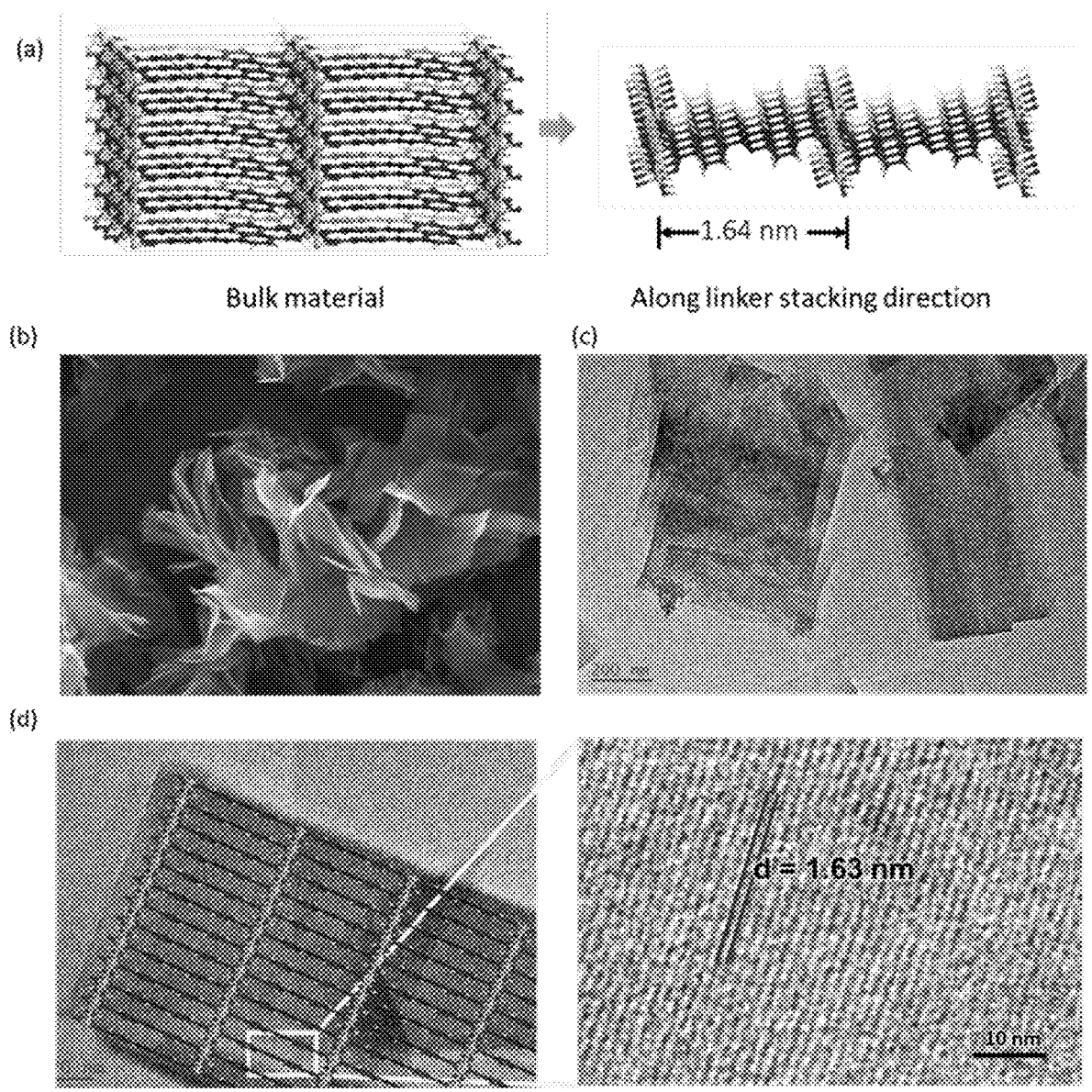
FIG. 6 shows (panel a) a structural model, (panel b) SEM and (panel c) TEM images of 2D nanosheets exfoliated along linker stacking direction of bulk $Ni_2(OH)_2(L4)$. TEM images of 2D nanosheets showing the lattice fringes (panel d). The structural model of 2D nanosheets matched well with the orientation and spacing of lattice fringes under TEM.

Besides chemical stability, the low conductivity of MOFs is another concern when applied as electrocatalysts. Indeed, most of the catalytic active sites within the bulk MOF materials are not electronically accessible on the electrode during electrocatalysis. This problem can be addressed by reducing the thickness of MOFs, producing 2D MOF nanosheets. For MHOFs such as $Ni_2(OH)_2(L4)$, two possible exfoliation directions can be realized: a) along NiOH layer direction or b) along linker stacking direction. To be exfoliated along NiOH layer direction, the Ni—COO bonds and π stacking were partially broken, while the Ni—OH bonds are mostly maintained (FIG. 5a). On the other hand, the second exfoliation direction maintain all π-stacking, but partially breaks M-OH bonds and M-COO bonds (FIG. 6, panel a).

By judicious control of synthetic conditions, two types of 2D nanosheets were successfully obtained. Using an excess amount of $Ni^{2+}$ resource and acetates (OAc-) as terminal ligands, 2D-MOF nanosheets along NiOH layer direction (FIG. 5, panel a) was resulted. SEM and TEM indicates free standing nanosheets up to several micrometers in size (FIG. 5, panels b and c). Wrinkled sheets were observed from the TEM (FIG. 5c), suggesting the ultrathin and soft nature of the nanosheets. This morphology is very similar to that of exfoliated $Ni(OH)_2$ layer. The lattice is not observed in TEM image which is attributed to the small b- and c-axis lengths.

Alternatively, 2D-MOF along linker stacking direction (FIG. 6, panel a) can be produced by mechanical exfoliation of bulk MOF particles via sonication. SEM and TEM images clearly showed the free standing 2D MOF nanosheets (FIG. 6, panels b and c). In contrast to the wrinkled morphology of 2D-MOF along NiOH layer direction, 2D-MOF nanosheets along linker stacking direction shows a regular rectangle shape. The lattice of MOFs can be directly observed under TEM (FIG. 6, panel d). The distance between lattice planes were measured to be 1.63 nm, which is agree with the interlayer distance from crystal structures (1.64 nm). The rectangle morphology and the orientation of lattice fringes are also in line with the proposed molecular structure of 2D-nanosheets (FIG. 6, panel d, left).

Figure 7:
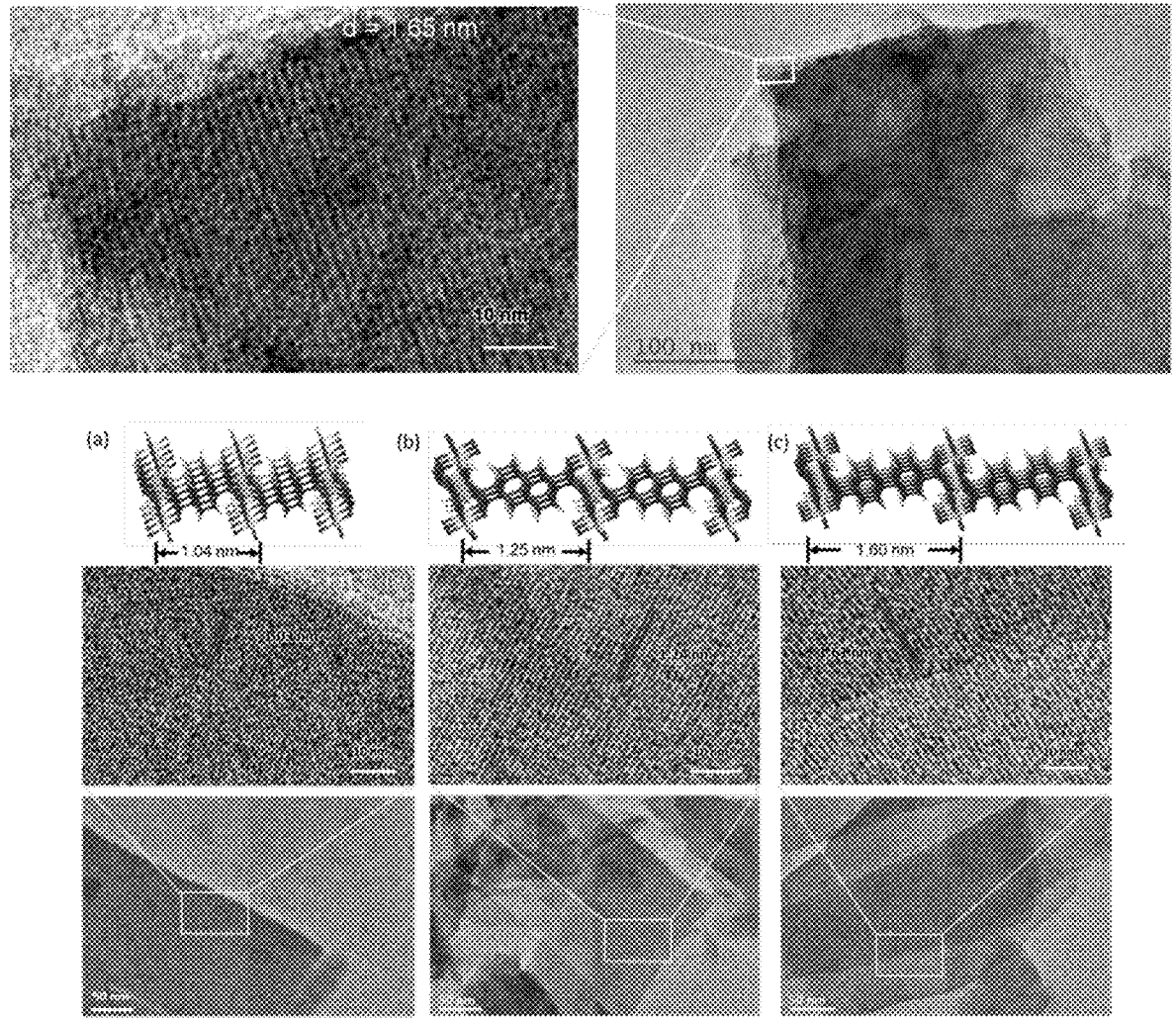
FIG. 7 shows a structural model and TEM images of $Ni_2(OH)_2(L1)$ (panel a), $Ni_2(OH)_2(L2)$ (panel b), and $Ni_2(OH)_2(L3)$ (panel c) nanosheets exfoliated along linker stacking direction.

Following similar method, 2D MOF nanosheets can be synthesized for $Ni_2(OH)_2(L1)$, $Ni_2(OH)_2(L2)$, and $Ni_2(OH)_2(L3)$ respectively. TEM image shows the rectangle shaped nanosheets for all the samples, indicating their similar crystal structure (FIG. 7). The distance between lattice planes were measured to be 1.04, 1.25, and 1.60 nm respectively, indicating a gradually increased a-axis length with elongated linkers. These values agree well with the interlayer distance from crystal structures (1.03, 1.24, and 1.61 nm respectively).

Figure 8:
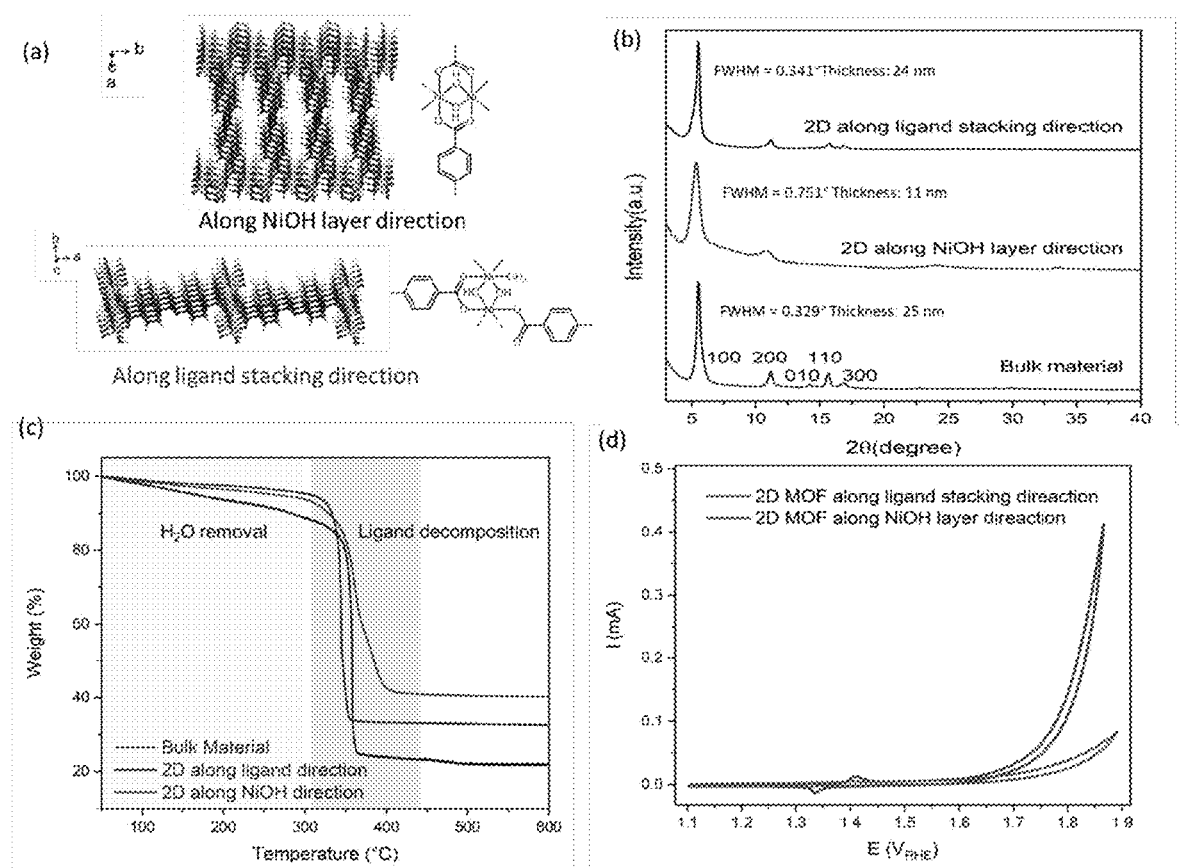
FIG. 8 shows (panel a) Structural model and formula of 2D nanosheets exfoliated along NiOH layer direction (left) and linker stacking direction (right) of bulk $Ni_2(OH)_2(L4)$.

Besides SEM and TEM, the structures of 2D MOF nanosheets exfoliated along two different directions were also supported by PXRD patterns and TGA curves. PXRD patterns of 2D nanosheets exfoliated along NiOH layer clearly shows a reduced intensity and broaden of 100 peaks, corresponding to the reduced thickness along a-axis direction (FIG. 8, panel b). The full width at half maximum (FWHM) of 100 peaks was significantly reduced upon exfoliation, indicating a reduced crystal dimension along a-axis according to Scherrer equation. For 2D-MOF along linker stacking direction, the diffraction peaks, especially the 100 family, almost maintained after exfoliation, indicating the unaltered stacking along a-axis direction. TGA curves indicate different compositions of 2D MOF nanosheets exfoliated along two directions (FIG. 8, panel c). By exfoliating along NiOH layer direction, organic linkers were partially removed, which explained the decreased weight loss upon ligand decomposition at around 350° C. In contrast, when 2D MOF nanosheets were exfoliated along linker stacking direction, Ni species were partially removed, corresponding to the increased weight loss of organic species at 350° C.

Note that different exfoliation direction will expose different open metal sites. When exfoliated along NiOH layer direction, a 2D layer structure similar to $Ni(OH)_2$ was obtained with limited open metal sites on the surface. However, the edge site of NiOH layers will be fully exposed if exfoliate along linker stacking direction (FIG. 8, panel a). The edge sites possess coordinatively unsaturated Ni that is terminated by solvent molecules, which is believed to be the active sites for (electro)catalysis. A comparison of CV curves for different MOF nanosheets clearly shows a dramatically enhanced OER activity for samples exfoliated along linker stacking direction (FIG. 8, panel d). Note that it is difficult to expose edge sites in the synthesis of metal oxides or hydroxides because of the relatively high surface energy of these sites. However, this can be easily realized in MOF systems, highlighting their higher degree of control towards active site structures.

3. Tuning the Electronic Structures by Metal Doping

This class of MOFs allows the doping of significant amount of heterometals ($La^{3+}$, $Sc^{3+}$, $Ce^{3+/4+}$, $Al^{3+}$, $Fe^{3+}$) without altering the framework structures. The ratios of doping metals were determined by ICP-OES (Table 2) while the phase purity was confirmed by PXRD (FIG. 9, panel a). The metal doping changed the electronic structures of MOFs by inductive effects, as indicated by the shifted redox peaks in CV. The redox peak center shifts positively with decreasing pKa or increased electronegativity of corresponding doping metals (FIG. 9, panel b), which is similar to the trend observed in heterometal clusters and doped $Ni(OH)_2$ materials in the literature. However, compared to doped $Ni(OH)_2$ materials with very limited redox potential shift (20 mV), metal doping in MHOFs induced significant change in redox potential (100 mV). This observation indicates that the electronic structures of MOFs can be modulated within a larger range compared to metal oxides or hydroxides. The redox peak center was plotted against the pKa of doping metals, which shows a linear correlation (FIG. 9, panel c). Some strongly acidic metal cations with low pKa do not fit in the trend, because of their strong hydrophilic nature. They readily hydrolyze in water to form metal oxide impurity, therefore they are not uniformly incorporated in $Ni_2(OH)_2$ (L4). This is supported by the elemental mapping by EDX under SEM. $Bi/Ni_2(OH)_2(L4)$ clearly shows the phase separation with Bi concentrated aggregates (FIG. 10, panel a). The other metals such as $Fe^{3+}$, were uniformly distributed under SEM/EDX (FIG. 10, panel b). Sc, Ce, and Zn are shown in FIGS. 17-19. The effect of carbon doping can be found seen in FIG. 20.

TABLE 2

Ratios of doping metals with different pKa in $M/Ni_2(OH)_2(L4)$ determined by ICP-OES.

| Sample | Doping ratio (%) | pKa |
|---|---|---|
| $Ni_2(OH)_2(L4)$ | 0 | 9.86 |
| $Ga/Ni_2(OH)_2(L4)$ | 8.9 | 2.68 |
| $Ti/Ni_2(OH)_2(L4)$ | 16.0 | 1.01 |

TABLE 2-continued

Ratios of doping metals with different pKa
in M/Ni$_2$(OH)$_2$(L4) determined by ICP-OES.

| Sample | Doping ratio (%) | pKa |
|---|---|---|
| Y/Ni$_2$(OH)$_2$(L4) | 24.8 | 7.70 |
| La/Ni$_2$(OH)2(L4) | 17.9 | 9.06 |
| Ce/Ni$_2$(OH)$_2$(L4) | 15.6 | 5.50 |
| Al/Ni$_2$(OH)$_2$(L4) | 15.9 | 4.85 |
| Sc/Ni$_2$(OH)2(L4) | 16.7 | 4.30 |
| Bi/Ni$_2$(OH)$_2$(L4) | 23.4 | 1.51 |

The effect of electronic structure tuning on the OER activities were investigated. Generally, the OER onset potential was reduced by doping with electron withdrawing metal cations (FIG. 11, panel a). Fe$^{3+}$, the most acidic metal cations that are uniformly distributed in Fe/Ni$_2$(OH)$_2$(L4), shows the lowest onset potential of 1.57 V without adding any carbon. The onset potential can be further reduced to 1.51 V by adding carbon to increase the conductivity. The OER onset (1 mA cm$^{-2}$) potential is linearly correlated to the pKa of doping metals (FIG. 11, panel b). This is in line with the OER mechanism of Ni(OH)$_x$, materials. These materials are on the over-binding branch of OER volcano plot, meaning that the binding of O species to Ni is too strong. Strongly acidic metal cations with low pKa will withdraw the electron density from Ni center, therefore lower the binding energy of O species. This will shift the overpotential of catalyst towards the top of volcano plot, which explained the reduced onset potential and enhanced OER activity by metal doping.

In summary, a new class MOFs is reported, namely metal-hydroxide-organic frameworks (MHOFs), as a highly tunable platform to optimize the chemical stability, surface structures and electronic structures of active sites. In fact, many more properties of MHOFs are waiting to be explored. Considering the almost unlimited tunability of MHOFs by alternating the metal and organic species, this material is believed to have potential applications in the field of heterogenous catalysis, electrocatalysis, gas separations, and beyond.

Other embodiments are within the scope of the following claims.

What is claimed is:

1. A composition comprising:
a plurality of a transition metal hydroxide component, the transition metal hydroxide comprising a hydroxide of Mn$^{2+}$, Fe$^{2+}$, Co$^{2+}$, Ni$^{2+}$, Cu$^{2+}$, or Zn$^{2+}$ forming a plurality of sheets having a formula M$_2$(OH)$_2$(L), wherein M is Mn$^{2+}$, Fe$^{2+}$, Co$^{2+}$, Ni$^{2+}$, Cu$^{2+}$ or Zn$^{2+}$; and
a plurality of a ligand component L, the ligand component comprising at least two carboxylate groups linearly arranged on a backbone comprising an aryl group, wherein ligand components between adjacent sheets TT-stack with each other to form a three dimensional layered structure.

2. The composition of claim 1, wherein the plurality of the ligand components comprises linear dicarboxylate aromatic compounds.

3. The composition of claim 1, wherein the transition metal hydroxide is doped with a metal ion.

4. The composition of claim 3, wherein the metal ion is a gallium, titanium, zinc, zirconium, lanthanum, cerium, aluminum, copper, or iron ion.

5. The composition of claim 1, wherein the ligand component further comprises carbon.

6. The composition of claim 1, wherein the backbone further comprises a heteroaryl.

7. The composition of claim 1, wherein the plurality of the ligand components comprises linear dicarboxylate aromatic compounds.

8. A method for making a composition of claim 1 comprising:
Contacting a plurality of a transition metal hydroxide component with a plurality of a ligand component, the ligand component comprising at least two functional groups linearly arranged on a backbone comprising an aryl group, each functional group associated with one of the transition metal components, wherein the composition forms a layered structure.

9. A method of electrocatalyzing a reaction comprising electrolyzing a substrate with a composition of claim 1.

* * * * *